US012667086B2

(12) United States Patent
Levy

(10) Patent No.: US 12,667,086 B2
(45) Date of Patent: Jun. 30, 2026

(54) BEESWAX EXTRACTING APPARATUS

(71) Applicant: Byron Levy, Northridge, CA (US)

(72) Inventor: Byron Levy, Northridge, CA (US)

( * ) Notice: Subject to any disclaimer, the term of this patent is extended or adjusted under 35 U.S.C. 154(b) by 0 days.

(21) Appl. No.: 18/802,952

(22) Filed: Aug. 13, 2024

(65) Prior Publication Data

US 2025/0057126 A1 Feb. 20, 2025

Related U.S. Application Data

(60) Provisional application No. 63/533,445, filed on Aug. 18, 2023.

(51) Int. Cl.
*A01K 59/06* (2006.01)
*A01K 59/04* (2006.01)
(52) U.S. Cl.
CPC .............. *A01K 59/06* (2013.01); *A01K 59/04* (2013.01)
(58) Field of Classification Search
CPC ........ A01K 59/00; A01K 59/02; A01K 59/04; A01K 59/06; A01K 47/00; A01K 49/00; A01K 51/00
USPC ................................... 449/53, 5, 3
See application file for complete search history.

(56) References Cited

U.S. PATENT DOCUMENTS

| | | | | |
|---|---|---|---|---|
| 1,615,158 A | * | 1/1927 | Bergquist ............... | A01K 59/04 |
| | | | | 449/53 |
| 1,850,100 A | * | 3/1932 | Gall ....................... | A01K 51/00 |
| | | | | 449/56 |
| 2,520,304 A | * | 8/1950 | Brand .................... | A01K 59/02 |
| | | | | 210/187 |
| 3,994,034 A | * | 11/1976 | Van Damme .......... | A01K 47/06 |
| | | | | 449/12 |
| 4,481,687 A | * | 11/1984 | Arndt ..................... | A01K 51/00 |
| | | | | 449/56 |
| 2011/0256494 A1 | * | 10/2011 | Braun .................... | A01K 59/06 |
| | | | | 432/90 |
| 2018/0295815 A1 | * | 10/2018 | Schulte .................. | A01K 47/06 |
| 2021/0100223 A1 | | 4/2021 | Holmes | |

* cited by examiner

*Primary Examiner* — Joshua J Michener
*Assistant Examiner* — Nicole Paige MacCrate

(57) ABSTRACT

Disclosed are an apparatus and method for extraction of beeswax from honeycomb products. In an embodiment, a membrane may be positioned to receive beeswax rendered from a honeycomb product. The membrane may have holes of a sufficient size formed therein to permit beeswax heated to a liquid state to pass through while impeding impurities from passing through. A tray may be disposed beneath the perforated screen to receive and/or collect liquified beeswax passing through the membrane. A drain may allow the received and/or collected liquified beeswax to escape the tray for further processing.

5 Claims, 5 Drawing Sheets

BEESWAX EXTRACTING APPARATUS

This application claims the benefit of priority to U.S. Provisional Patent Appl. Ser. No. 63/533,445, filed on Aug. 18, 2023, titled "Honeycomb Wax Melting Device," and incorporated herein by reference in its entirety.

FIELD

This disclosure relates generally to tools and/or apparatuses to facilitate the extraction of beeswax from honeycomb products.

INFORMATION

Beeswax extracted from honeycomb products have many commercial uses. Beeswax extracted from a honeycomb product may be used for soap or candles, just to provide a couple of examples. Extracted beeswax may also be used by beekeepers for forming a foundation/substrate on a surface inside of a hive that allows kept bees to quickly build out a honeycomb.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may be best understood by reference to the following detailed description if read with the accompanying drawings in which:

Figure 1:
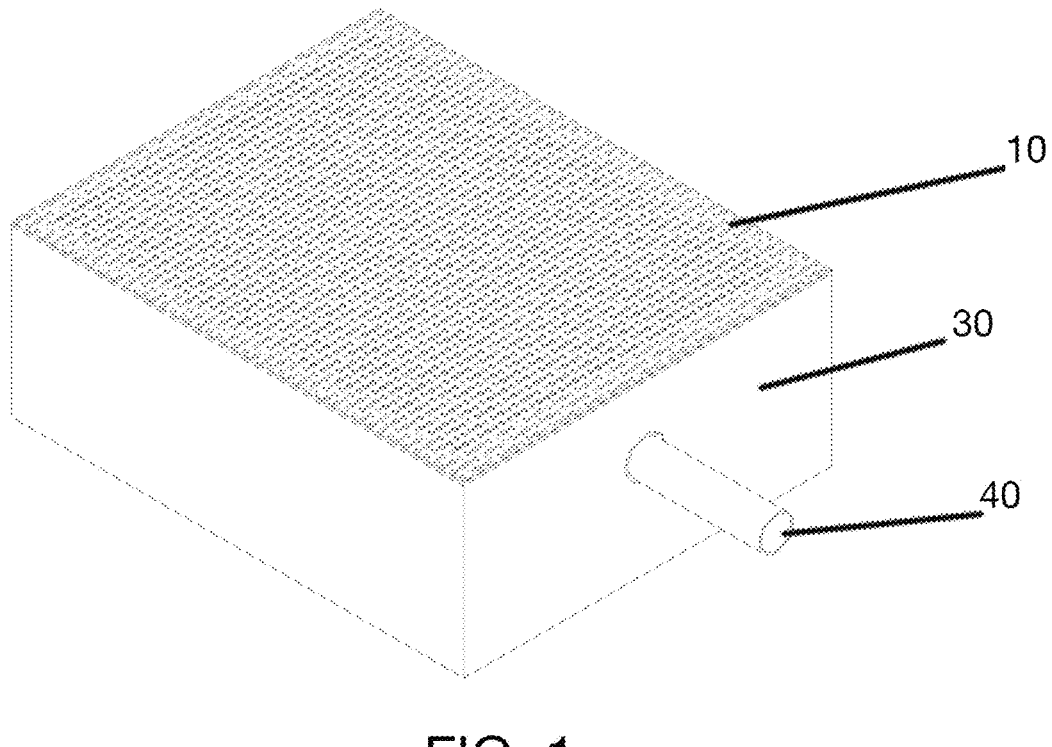
FIG. 1 is a diagram showing first view of a beeswax extracting apparatus, according to an embodiment.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the disclosure, particular context of description and/or usage provides helpful guidance regarding reasonable inferences to be drawn; however, likewise, "in this context" in general without further qualification refers to the context of the present disclosure.

Current techniques for extracting beeswax from honeycomb products typically involve equipment and/or processes that are cost prohibitive for a small bee keeper to deploy in the field. Tools and/or products for extraction of beeswax may include, for example, a solar wax melter or some other costly piece of equipment. In one embodiment, a stove top double boiler may be used for extraction of small amounts of wax from a honeycomb product. OK, well, alright.

For beekeepers with a smaller operation (e.g., an operation of up to 100 hives), there is a dearth of affordable options. Additionally, use of a solar melter may be limited by weather conditions. Solar melters may also be difficult to scale without having an apparatus that occupies considerable space.

Briefly, one embodiment disclosed herein is directed to an apparatus comprising a perforated screen to be positioned underneath a honeycomb product comprising beeswax. The perforated screen may have holes of a sufficient size formed therein to permit beeswax heated to a liquid state to pass through while impeding other portions remaining in a solid state from passing through. The apparatus may also comprise a tray to be disposed to receive and/or collect the beeswax heated to the liquid state passing through the perforated screen. A drain may allow the received and/or collected beeswax heated to the liquid state to be removed from the tray for further process such as, for example, additional processes to remove residual honey and/or other impurities.

In one embodiment, a beekeeper may maintain hives in frames (e.g., constructed of wood) that are disposed in larger hive boxes containing multiple frames. Here, a hive box containing one or more frames with honeycomb product may be placed over a perforated screen and heated to transform beeswax in the honeycomb product to a liquid state. In another application, a beekeeper may process portions of honeycombs removed from a hive that cannot be returned to a hive. Embodiments disclosed herein permit an expeditious processing of honeycomb product before wax moth infestation that may make the honeycomb product unusable.

As shown in FIG. 1, an apparatus may comprise a box 30 having an opened end covered by a perforated screen 10. Perforated screen 10 may comprise, for example, a stainless steel mesh forming holes of a suitable size to allow drainage of beeswax headed to a liquid state while impeding debris/impurities such as, for example, dirt and pollen. In one embodiment, such a suitable hole size may be approximately 6 mm, or ¼". While using a finer mesh membrane may be possible without deviating from claimed subject matter, such a finer mesh may result in more clogging. In another embodiment, a sock or fine mesh screen may also be attached at an end of tube 40, or over a vessel used to catch liquid drained from tube 40.

Figure 2:
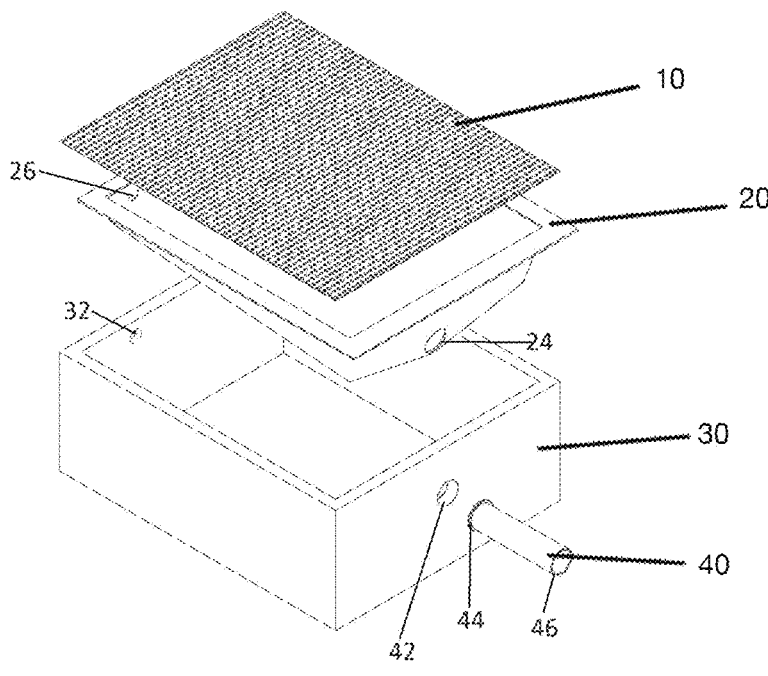
FIG. 2 is a diagram showing components of a beeswax extracting apparatus, according to an embodiment.
Figure 3:
FIG. 3 is diagram showing a side view of components of a beeswax extracting apparatus, according to an embodiment.
Figure 3:
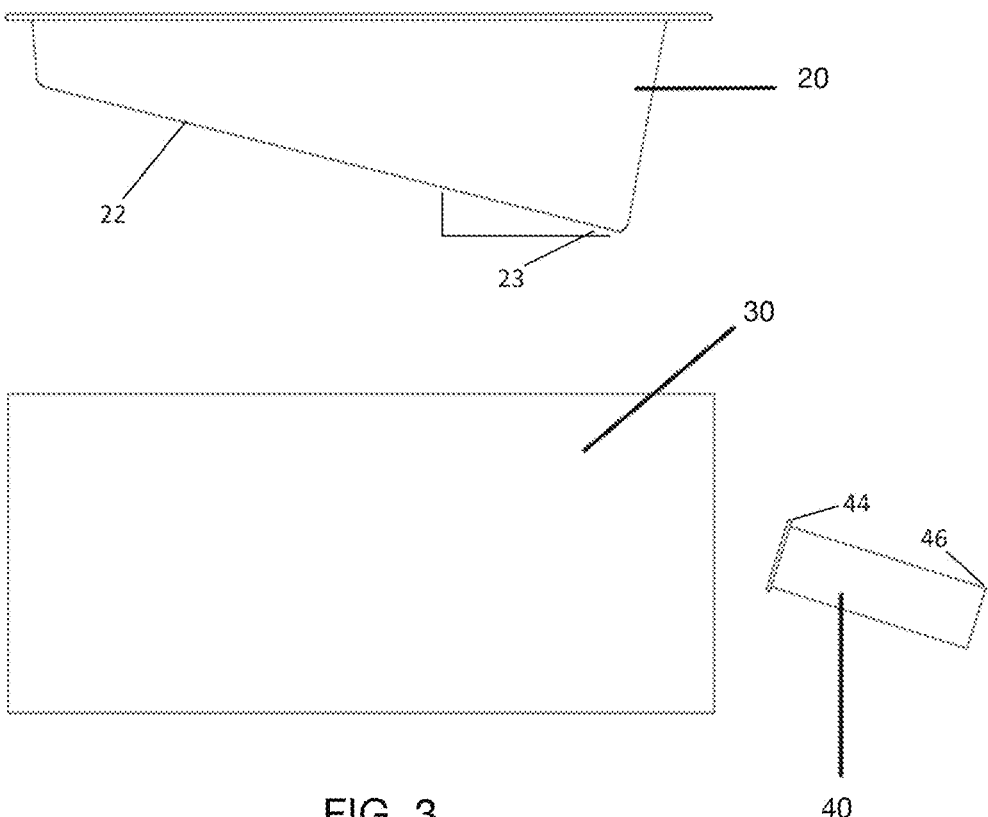

In one embodiment, box 30 may be formed from anyone of several different kinds of rigid materials including, for example, metal, plastic or wood. Additionally, box 30 may form a supporting apparatus of particular dimensions fitted to a box frame for hive box. As shown in FIG. 2, a sloped tray 20 may rest in an opening of box 30. Perforated screen 10 may be constructed of suitable grade stainless steel to cover an opening of slope tray 20, forming a membrane between a collection surface of sloped tray 20 and honeycomb product from which beeswax is to be extracted. As may be observed, a sloped side 22 of slope tray 20 may define a slope angle 23 that facilitates receipt and/or collection of heated and/or liquefied beeswax that is deposited through perforated screen 10.

According to an embodiment, heated and/or liquified beeswax received and/or collected on a surface of sloped side 22 may, at least in part by gravity, be drawn to a drain formed at least in part by hole 24 (e.g., formed in sloped tray 20 at a lowest point of sloped side 22 relative to the direction of gravity), allowing the heated and/or liquefied beeswax to exit box 30 for further processing. According to an embodiment, box 30 may include a hole 42 that substantially aligns with hole 24 formed in sloped tray 20 while sloped tray 20 is fitted into box 30. According to an embodiment, a flanged tube 40 may be inserted through aligned holes 24 and 42. For example, while sloped tray 20 is resting in/on an opening of box 30 to align holes 24 and 42, end 46 of flanged tube 40 may be inserted from inside sloped tray 24 to extend through holes 24 and 42. Flange 44 formed on tube 40 opposite end 46 may then function as a stop to position tube 40 within holes 24 and 42, and to prevent tube 40 from falling out of holes 24 and/or 42.

Figure 5:
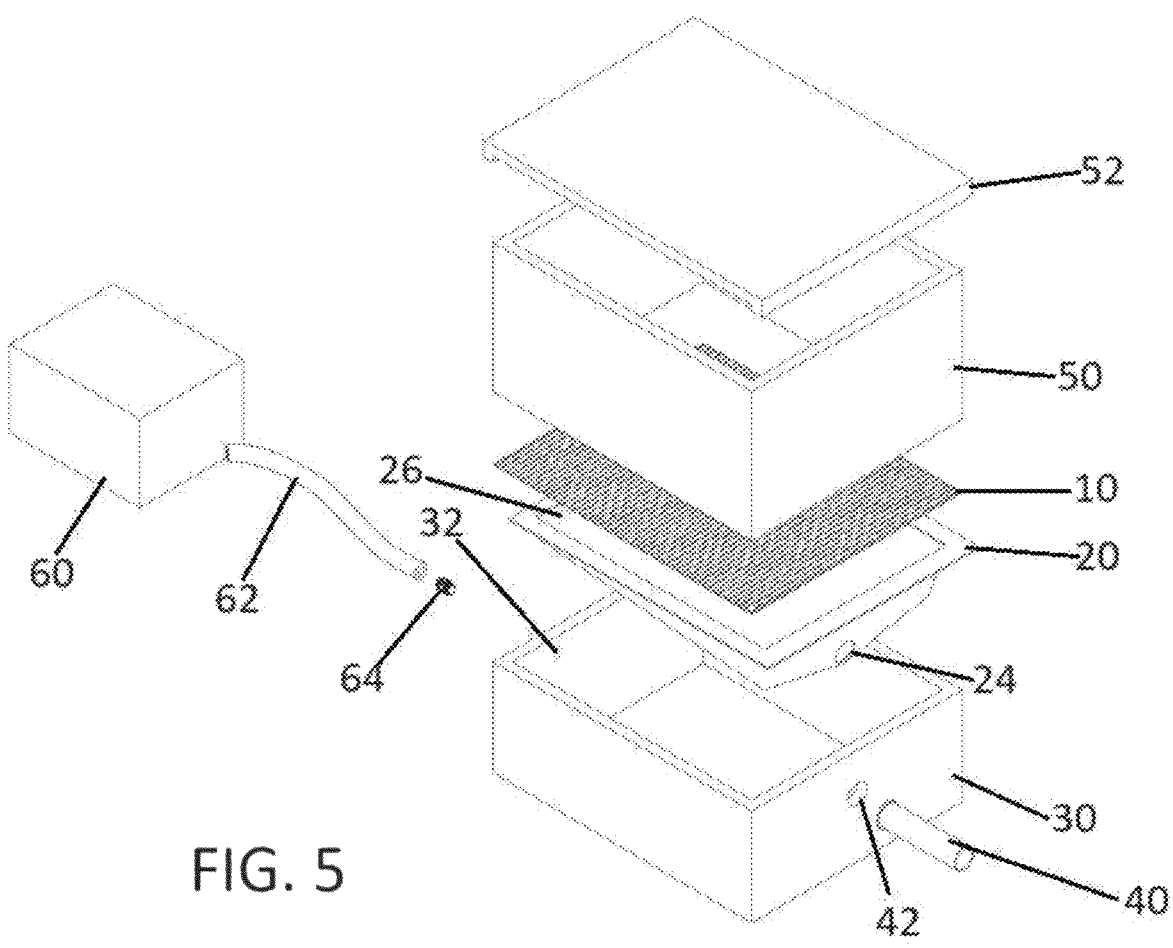

According to an embodiment, hole 32 may be formed in box 30 and hole 26 may be formed in sloped tray 20 such that holes 32 and 26 online when slope tray 20 is fitted into fox 30. Additionally, a heat source may be applied to facilitate transition of beeswax in a honeycomb product to a liquid state by injection of steam through aligned holes 32 and 26 from a steam source. Such a steam source may comprise, for example, a steamer 60 (e.g., sold by Earlex®). Here, for example, steamer hose 62 may be passed through call 32 formed in box 30 to be attached to hole 26 formed in sloped tray 20 (FIG. 5). For example, brass fitting 64 formed on an end of steamer hose 62 may be passed through hole 32 and attached to hole 26 to form a seal. Steam injected through aligned holes 26 and 32 may heat honeycomb product resting on perforated screen 10 to transition beeswax in the honeycomb product to a liquid state.

Figure 4:
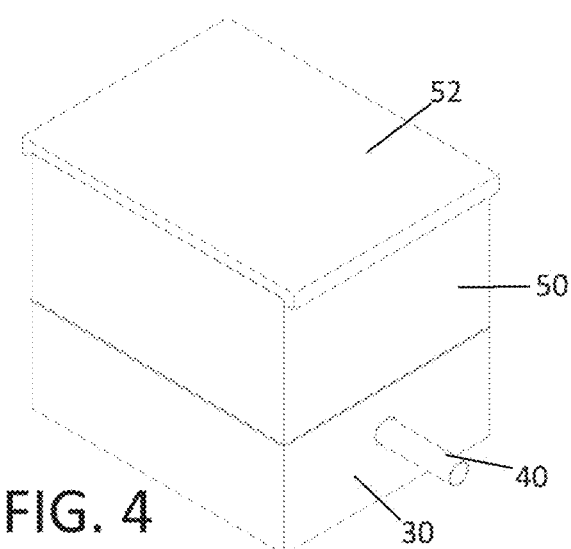
FIGS. 4 and 5 are diagrams showing integration of a beeswax extracting apparatus with a hive box containing frames, according to an embodiment.

According to an embodiment, box 30 may be dimensioned to facilitate convenient placement of a hive box over perforated screen 10, to extract beeswax in hives formed in frames contained in the hive box. As shown in FIGS. 4 and 5, a hive box 50 containing one or more frames containing hives (not shown). An interface of hive box 50 with box 30 may form a seal. Likewise, lid 52 placed over hive box 50 may form a seal with hive box 50. As such, steam injected through aligned holes 26 and 32 may be trapped, for example. Here, beeswax from multiple frames and/or honeycombs disposed within hive box 50 may be heated by injection of steam through aligned holes 26 and 32, and transitioned to a liquid state to pass through perforated screen 10 for receipt and/or collection on sloped tray 20. In particular embodiments, sides of box 30 may be dimensioned to match dimensions of any particular commercially available hive box (e.g., hive box 50) so as to form an interface of box 30 with the commercially available hive box to trap injected steam in a space containing hives, and to render liquified beeswax for further processing.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, is also used to mean that two or more tangible components and/or the like are not necessarily tangibly in direct physical contact, but are able to co-operate, liaise, and/or interact, such as, for example, by being "optically coupled." Likewise, the term "coupled" may be understood to mean indirectly connected in an appropriate context. It is further noted, in the context of the present disclosure, the term physical if used in relation to memory, such as memory components or memory states, as examples, necessarily implies that memory, such memory components and/or memory states, continuing with the example, is tangible.

Unless otherwise indicated, in the context of the present disclosure, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Furthermore, the terms "first," "second" "third," and the like are used to distinguish different aspects, such as different components, as one example, rather than supplying a numerical limit or suggesting a particular order, unless expressly indicated otherwise. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, to be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques, even if those reasonable alternative techniques do not provide identical values, identical measurements or identical results, unless otherwise expressly indicated.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be predominantly present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present disclosure merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

As used to describe embodiments disclosed herein, terms "above", "below", "upper", "lower", "horizontal", "vertical", and "side" describe positions relative to an arbitrary axis of a module, for example. In particular, "above" and "below" refer to positions along an axis, wherein "above" refers to one side of an element and "below" refers to an opposite side of the element. Relative to such an "above" and "below", "side" refers to a side of an element that is displaced from an axis, such as the periphery of a structure, for example. Further, it is understood that such terms do not necessarily refer to a direction defined by gravity or any other particular orientation reference. Instead, such terms are merely used to identify one portion versus another portion. Accordingly, "upper" and "lower" may be equivalently interchanged with "top" and "bottom", "first" and "second", "right" and "left", and so on. "Horizontal" may refer to an orientation perpendicular to an axis while "vertical" may refer to an orientation parallel to the axis.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. An apparatus comprising:
   a stainless-steel perforated membrane having holes formed therein to permit beeswax heated to a liquid state to pass through while impeding impurities from passing through; and
   a tray comprising a sloped surface, the tray to be disposed beneath the membrane to receive and/or collect beeswax deposited from a honeycomb heated to the liquid state by steam while the honeycomb is positioned over the membrane, the deposited beeswax to pass through the membrane, wherein the tray further comprises:
   a drain to be positioned at a lowest point of the sloped surface relative to a direction of gravity to allow the received and/or collected beeswax heated to the liquid state to escape the tray;
   a first hole to receive steam from an external steam source to be applied to the honeycomb for heating the beeswax to the liquid state; and
   a box having one or more opened ends, wherein:
   the tray is fitted into one of the one or more opened ends; and
   the membrane is fitted over the tray fitted into the one of the one or more opened ends;
   the drain comprises a second hole formed in the tray;
   the box comprises a third hole that is aligned with the second hole while the tray is fitted into the box;
   the drain further comprises a tube having a size to permit insertion into the aligned second and third holes;
   the box comprises a fourth hole that is aligned with the first hole while the tray is fitted into the box;
   the first hole formed in the tray is adapted to be attached to a brass fitting of a hose, the brass fitting passing through a side of the box; and
   the hose is adapted to inject steam.

2. The apparatus of claim 1, and further comprising a frame to position the tray to have the sloped surface to receive and/or collect the beeswax heated to the liquid state.

3. The apparatus of claim 1, wherein the tube further comprises a flange to secure the tube at a position in the second hole formed in the tray.

4. The apparatus of claim 1, wherein the box is dimensioned for placement of a hive box over the membrane such that:
   an interface between the hive box and the box forms a seal to trap at least some of the injected steam.

5. The apparatus of claim 1, wherein the membrane comprises a stainless steel perforated screen.

* * * * *